United States Patent

Hayashi et al.

[11] Patent Number: 5,906,256
[45] Date of Patent: May 25, 1999

[54] AUTOMATIC CLUTCH UNIT FOR VEHICLE USE

[75] Inventors: Masahiko Hayashi; Kazuhiko Kobayashi; Hiroyuki Arai; Nobuo Sugamura, all of Kanagawa, Japan

[73] Assignee: Isuzu Motors Limited, Tokyo, Japan

[21] Appl. No.: 08/831,017

[22] Filed: Mar. 31, 1997

[30] Foreign Application Priority Data

Mar. 31, 1996 [JP] Japan .................................. 8-101862
Mar. 31, 1996 [JP] Japan .................................. 8-101863

[51] Int. Cl.$^6$ ...................................................... F16D 19/00
[52] U.S. Cl. ........................ 192/83; 192/3.58; 192/91 R; 192/85 C
[58] Field of Search ...................... 192/83, 3.58, 85 C, 192/91 R, 3.62

[56] References Cited

U.S. PATENT DOCUMENTS

| 3,752,282 | 8/1973 | Espenshied ........................... 192/91 R |
| 5,135,091 | 8/1992 | Albers et al. ......................... 192/85 C |
| 5,217,097 | 6/1993 | Lasoen ................................... 192/83 X |

FOREIGN PATENT DOCUMENTS

| 0 090 945 | 10/1983 | European Pat. Off. ........ B60K 41/02 |
| 0 231 465 | 8/1987 | European Pat. Off. ........ F16D 25/14 |
| 43 27 881 | 7/1994 | Germany ........................ B60K 23/02 |
| 4-8023 | 3/1992 | Japan ............................... B60K 41/22 |
| 378609 | 7/1964 | Switzerland ............................... 47/11 |

Primary Examiner—Charles A. Marmor
Assistant Examiner—Saúl J. Rodríguez
Attorney, Agent, or Firm—Sughrue, Mion, Zinn, Macpeak & Seas, PLLC

[57] ABSTRACT

An automatic clutch unit for vehicle use includes a slave cylinder to engage and disengage a friction clutch, an automatically operated hydraulic fluid feed mechanism to be operated by a pump, selectively connected with the slave cylinder, a manually operated hydraulic fluid feed mechanism to be operated by the action of a clutch pedal, selectively connected with the slave cylinder and a change-over cylinder having a piston pushed to one side of the cylinder by a spring, arranged among a hydraulic fluid pipeline of the manually operated hydraulic fluid feed mechanism, a hydraulic fluid pipeline of the automatically operated hydraulic fluid feed mechanism and a hydraulic fluid pipeline of the slave cylinder, wherein the piston side of the cylinder is connected with the hydraulic fluid pipeline of the manually operated hydraulic fluid feed mechanism, and the spring side of the cylinder is connected with the hydraulic fluid pipelines of the automatically operated hydraulic fluid feed mechanism and the slave cylinder, and hydraulic pressure generated by depressing the clutch pedal is transmitted to the slave cylinder when the piston of the change-over cylinder is moved.

2 Claims, 3 Drawing Sheets

AUTOMATIC CLUTCH UNIT FOR VEHICLE USE

BACKGROUND OF THE INVENTION

1. Field of the Invention

The present invention relates to improvements in an automatic clutch unit for vehicle use which can be manually operated, too.

2. Related Art

Conventionally, an automatic transmission is well known in which the transmission is automatically controlled in accordance with an engine speed, degree of the accelerator opening and vehicle speed, and a mechanical friction clutch is automatically engaged and disengaged so that the vehicle speed can be controlled. For example, Japanese Examined Utility Model Publication No. 4-8023 discloses an automatic transmission for vehicle use in which the mechanical friction clutch can be manually operated.

According to the automatic transmission disclosed in the above utility model publication, operation is conducted as follows. When a vehicle is started in a specific driving condition, for example, when a vehicle is started while it must get over an obstacle, or when a vehicle is started on a steep slope or a snow-covered road, it is difficult for a friction clutch of the automatic transmission to be appropriately engaged or disengaged, so that it becomes impossible to start the vehicle. In the above case, the automatic clutch control is stopped, and the clutch is manually engaged or disengaged in the automatic transmission disclosed in the above utility model publication. The control system of the above automatic transmission includes: a means for interrupting a clutch operation signal, which is outputted in the changing operation of a gear ratio, when a clutch pedal is depressed; a control valve for controlling the feed of hydraulic fluid to a clutch booster (actuator such as a slave cylinder) in accordance with the motion of the clutch pedal; and a double check valve for selectively feeding the hydraulic fluid to the above booster.

On the other hand, an automatic clutch unit illustrated in FIGS. 3 and 4 is put into practical use, in which the transmission is manually operated and only the clutch is automatically engaged and disengaged in accordance with the operating condition of a vehicle. In the above automatic clutch unit, if necessary, the driver can manually operate the clutch according to his free will when it becomes impossible to operate the clutch automatically.

This automatic clutch unit comprises a manually operated hydraulic fluid feed mechanism 10 and an automatically operated hydraulic fluid feed mechanism 21. The manually operated hydraulic fluid feed mechanism 10 includes: a slave cylinder 4 connected with an upper end of the clutch release fork 3, the lower end of which pushes a release bearing 2, wherein the clutch release fork 3 is turned round a point "a"; a power mechanism 6 operated when a clutch pedal 5 is depressed; a master cylinder 8 having an oil tank 7; and an hydraulic fluid pipeline 9 connected with the cylinder 8. The automatically operated hydraulic fluid -feed mechanism 21 includes: a gear pump 14 connected with an oil tank 11 via a pipeline 12, driven by a motor 13; a hydraulic fluid pipeline 16 connected with the gear pump 14 via a check valve 15; a relief valve 18 arranged in a pipeline 17 from an intermediate portion between the gear pump 14 and the check valve 15, to the oil tank 11; and an electromagnetic valve 20 arranged in a return pipeline 19 provided from the above hydraulic fluid pipeline 16 to the oil tank 11. Both hydraulic fluid pipelines 9 and 16 are connected with a pipeline 23 via a change-over mechanism 22, and the pipeline 23 is connected with the slave cylinder 4.

For example, an electromagnetic change-over valve 22' illustrated in FIG. 4 is used as the change-over mechanism 22. The electromagnetic change-over valve 22' changes over between the hydraulic fluid pipeline 9 of the manually operated hydraulic fluid feed mechanism 10 and the hydraulic pipeline 16 of the automatically operated hydraulic fluid feed mechanism 21, so that hydraulic fluid can be fed into the slave cylinder 4.

In the above arrangement, when the frictional clutch 1 is changed over from the manual to the automatic operation, the change-over mechanism 22 (electromagnetic valve 22') is manually or automatically changed over to the automatic operation. At the same time, when the gear pump 14 is driven by the motor 13, the check valve 15 is opened by the action of pressured hydraulic fluid. Therefore, hydraulic fluid flows into the hydraulic fluid pipeline 16 and the change-over mechanism 22 (electromagnetic valve 22') and then gets into the slave cylinder 4 via the pipeline 23. Therefore, the piston 4a is pushed to the right in FIGS. 3 and 4 by the action of pressured hydraulic fluid. Due to the foregoing, the clutch release fork 3 is turned clockwise around the fulcrum "a", so that the release bearing 2 is pushed to the left, and the friction clutch 1 is disengaged. When a position sensor (not shown in the drawing) arranged in the sleeve cylinder 4 detects that the piston 4a has moved by a predetermined distance, an electric current to be fed to the motor 13 is turned off and the pump 14 is stopped.

After the electric current to be fed to the motor 13 has been turned off and the gear pump 14 has stopped, the electromagnetic valve 20 to adjust a returning speed of hydraulic fluid is opened while its being controlled, hydraulic fluid in the slave cylinder 4 is returned to the oil tank 11 by the returning motion of the piston 4a caused by the spring of the friction clutch 1, the release bearing 2 and the clutch release fork 3, via the pipeline 23, the hydraulic fluid pipeline 16, the return pipeline 19 and the electromagnetic valve 20. Due to the foregoing, the frictional clutch 1 is engaged.

When the change-valve 22 is manually or automatically changed over to the manual operation, the change-over mechanism 22, that is, the electromagnetic change-over valve 22' is changed over to the manual operation side as illustrated in FIG. 4, and then the clutch pedal 5 is depressed. Then the power mechanism 6 is operated, and the piston 8a in the master cylinder 8 is moved to the left in FIGS. 3 and 4. Therefore, hydraulic fluid is sent to the slave cylinder 4 via the hydraulic fluid pipeline 9, the change-over mechanism 22 (electromagnetic change-over valve 22') and the pipeline 23. Accordingly, the piston 4a is pushed to the right in FIGS. 3 and 4. Due to the foregoing, the clutch release fork 3 is turned clockwise round the fulcrum "a", so that the release bearing 2 is pushed to the left. Therefore, the friction clutch 1 is disengaged.

When the clutch pedal 5 is returned to its initial position, the piston 8a in the master cylinder 8 is returned to the right in FIGS. 3 and 4 by the springs in the cylinder 8 and the power mechanism 6. At the same time, by the returning motion of the piston 4a caused by the spring in the friction clutch 1 via the release bearing 2 and the clutch release fork 3, hydraulic fluid in the slave cylinder 4 flows into the pipeline 23 and the hydraulic fluid 9. Then hydraulic fluid returns to the oil tank 7 via the master cylinder 8. Due to the foregoing, the friction clutch 1 is engaged.

In this connection, in the friction clutch operated by hydraulic fluid as illustrated in FIG. 3, when the electromagnetic change-over valve 22' is used for the change-over mechanism as illustrated in FIG. 4, the following problems may be encountered.

(1) Unbalance of quantity of hydraulic fluid between both hydraulic fluid feed mechanisms:

When the above operation to change over between the automatic operation and the manual operation is conducted in the case of engagement of the friction clutch 1, that is when the above operation to change over between the automatic operation and the manual operation is conducted in the case where the piston 4a of the slave cylinder 4 is located at the left end in FIG. 3 so that no hydraulic fluid is accommodated in the slave cylinder 4, no hydraulic fluid flows between both the hydraulic feed mechanisms 10 and 21. Accordingly, no problems are caused. However, when the above operation to change over between the automatic operation and the manual operation is conducted in the case of disengagement of the friction clutch 1, that is, when the above operation to change over between the automatic operation and the manual operation is conducted in the case where the piston 4a of the slave cylinder 4 is located at a position illustrated in FIGS. 3 and 4 or at a right position with respect to the position illustrated in FIGS. 3 and 4 so that the slave cylinder 4 is filled with hydraulic fluid, hydraulic fluid flows between both the hydraulic fluid feed mechanisms 10 and 21. As a result, one of the oil tanks 7 and 11 overflows, and the other is emptied.

For example, after the friction-clutch 1 has been disengaged by depressing the clutch pedal 5, in this case the slave cylinder 4 is filled with hydraulic fluid sent from the oil tank 7, the electromagnetic change-over valve 22' is changed over to the automatic operation. Then the pipeline 23 connected with the slave cylinder 4 is disconnected from the hydraulic fluid pipeline 9 connected with the oil tank, but the pipeline 23 is connected with the returning pipeline 19 of the automatically operated hydraulic fluid feed mechanism 19.

Accordingly, when the electromagnetic valve 20 is opened under the above condition, hydraulic fluid in the slave cylinder 4 flows to the oil tank 11 via the returning pipeline 19, so that the friction clutch 1 can be engaged. The above phenomenon means that hydraulic fluid flows from the oil tank 7 to the oil tank 11. When the above operation is repeated many times, the oil tank 7 is empties as described before, and hydraulic fluid overflows the oil tank 11.

(2) Fast start of a vehicle in the case of a change from automatic operation to manual operation:

When operation is changed over from the automatic operation to the manual operation under the condition that the friction clutch 1 is engaged, no problems are caused. However, when operation is changed over to the manual operation by the electromagnetic change-over valve 22' after the clutch 1 has been disengaged by the automatic operation, the following problems may be encountered. When the clutch pedal 5 is not depressed, the master cylinder 8 and the oil tank 7 are communicated with each other. Accordingly, all hydraulic fluid is returned from the slave cylinder 4 to the oil tank 7 via the pipeline 23, the electromagnetic change-over valve 22' and the hydraulic fluid pipeline 9. As a result, the friction clutch 1 is engaged. Accordingly, there is a possibility that the vehicle starts fast if the gears in the transmission are meshed with each other.

In order to prevent the occurrence of the above problems, it is possible to adopt an alternative arrangement in which the master cylinder 8 is remodeled and the hydraulic fluid passage between the oil tank 7 and the master cylinder 8 is closed under the condition that the clutch pedal 5 is disengaged. However, when the above alternative arrangement is adopted, the following problems may be encountered. For example, after a vehicle has been assembled, air bleeding is conducted so as to bleed air from the pipeline including the slave cylinder 4 and the master cylinder 8. In this case, it is impossible to bleed air that has reached the master cylinder 8.

There is another alternative arrangement in which both oil tanks 7 and 11 are integrated with each other. However, this alternative arrangement is not preferable. The reason is described as follows. In order to conduct air bleeding so as to bleed air from the manually operated hydraulic fluid feed mechanism 10, it is necessary for the oil tank 7 to be located at a position higher than that of the master cylinder 8. In order to prevent the occurrence of problems caused in the clutch when air is mixed in the hydraulic fluid or when the resistance in the pipeline is increased, it is necessary for the oil tank 11 to be located close to the pump 14. Therefore, it is not preferable to integrate both oil tanks 7 and 11.

It is possible to adopt still another alternative arrangement in which the change-over mechanism 22 of the electromagnetic change-over valve 22' is changed over when the clutch is engaged. However, the following problems may be encountered in this case.

(a) A connecting position of the friction clutch is changed when the clutch plate and other parts of the clutch are worn away. Therefore, it is difficult to conduct a positional detection by means of switches.

(b) It is possible to detect the present state of the friction clutch and the operating condition of the vehicle, and the clutch detection point is detected by using an electronic controller in which the results of the above detection is processed. However, when the above arrangement is adopted, the structure becomes complicated. Further, in the case of breakdown of the electronic system, that is, in the case where it is impossible to conduct the automatic operation, the manual operation can not be conducted smoothly.

SUMMARY OF THE INVENTION

Accordingly, an object of the present invention is to provide an automatic clutch unit for vehicle use capable of being manually operated too in which a quantity of hydraulic fluid accommodated in the automatically operated hydraulic fluid feed mechanism and that of hydraulic fluid accommodated in the manually operated hydraulic fluid feed mechanism are well balanced and the vehicle is not started fast even when operation is changed from the automatic operation to the manual operation, wherein it is not necessary to remodel the master cylinder and conduct processing in the electronic controller.

Accordingly, another object of the present invention is to provide an automatic clutch unit for vehicle use capable of being manually operated too in which a quantity of hydraulic fluid accommodated in the automatically operated hydraulic fluid feed mechanism and that of hydraulic fluid accommodated in the manually operated hydraulic fluid feed mechanism are well balanced and the vehicle is not started fast even when operation is changed over from the automatic operation to the manual operation, and hydraulic fluid remaining in the slave cylinder is returned into the oil tank by a simple operation of the clutch pedal in the case of change-over, and at the same time a breakdown of the slave cylinder can be prevented which is caused when the clutch pedal is depressed too much.

In order to accomplish the above object, the present invention is to provide an automatic clutch unit for vehicle use comprising: a slave cylinder to engage and disengage a friction clutch; an automatically operated hydraulic fluid feed mechanism to be operated by a pump, selectively connected with the slave cylinder; a manually operated hydraulic fluid feed mechanism to be operated by the action of a clutch pedal, selectively connected with the slave cylinder; and a change-over cylinder having a piston pushed to one side of the cylinder by a spring, arranged among a hydraulic fluid pipeline of the manually operated hydraulic fluid feed mechanism, a hydraulic fluid pipeline of the automatically operated hydraulic fluid feed mechanism and a hydraulic fluid pipeline of the slave cylinder, wherein the piston side of the cylinder is connected with the hydraulic fluid pipeline of the manually operated hydraulic fluid feed mechanism, and the spring side of the cylinder is connected with the hydraulic fluid pipelines of the automatically operated hydraulic fluid feed mechanism and the slave cylinder, and hydraulic pressure generated by depressing the clutch pedal is transmitted to the slave cylinder when the piston of the change-over cylinder is moved. The aforementioned invention is defined as a first invention in this specification. In the first invention, there is provided a change-over cylinder having a first piston pushed to one side of the cylinder by a spring in the case of non-operation and a second piston pushed toward the first piston by a spring while a distance from the second piston to the first piston is maintained at a predetermined value, the change-over cylinder being arranged among a hydraulic fluid pipeline of the manually operated hydraulic fluid feed mechanism, a hydraulic fluid pipeline of the automatically operated hydraulic fluid feed mechanism and a hydraulic fluid pipeline of the slave cylinder, wherein the hydraulic fluid pipeline of the manually operated hydraulic fluid feed mechanism is connected with the first piston side of the change-over cylinder, the hydraulic fluid pipeline of the automatically operated hydraulic fluid feed mechanism is connected with a chamber of the change-over cylinder between both pistons, and the hydraulic fluid pipeline of the slave cylinder is connected with the pushing spring side of the second piston.

According to the present invention, there is provided an automatic clutch unit for vehicle use comprising: a slave cylinder to engage and disengage a friction clutch; an automatically operated hydraulic fluid feed mechanism to be operated by a pump, selectively connected with the slave cylinder; a manually operated hydraulic fluid feed mechanism to be operated by the action of a clutch pedal, selectively connected with the slave cylinder; and a change-over cylinder having a piston pushed to one side of the cylinder by a spring, arranged among a hydraulic fluid pipeline of the manually operated hydraulic fluid feed mechanism, a hydraulic fluid pipeline of the automatically operated hydraulic fluid feed mechanism and a hydraulic fluid pipeline of the slave cylinder, wherein the piston side of the cylinder is connected with the hydraulic fluid pipeline of the manually operated hydraulic fluid feed mechanism, and the spring side of the cylinder is connected with the hydraulic fluid pipelines of the automatically operated hydraulic fluid feed mechanism and the slave cylinder, and a relief valve for adjusting pump discharge pressure arranged in the automatically operated hydraulic fluid feed mechanism is connected between the hydraulic fluid pipeline of the automatically operated hydraulic fluid feed mechanism and an oil tank, and a stopper to restrict a stroke of the slave cylinder is arranged in the slave cylinder. The second invention is to provide a change-over cylinder having a first piston pushed to one side of the cylinder by a spring in the case of non-operation and a second piston pushed toward the first piston by a spring while a distance from the second piston to the first piston is maintained at a predetermined value, wherein the hydraulic fluid pipeline of the manually operated hydraulic fluid feed mechanism is connected with the first piston side of the change-over cylinder, the hydraulic fluid pipeline of the automatically operated hydraulic fluid feed mechanism is connected with a chamber of the change-over cylinder between both pistons, the hydraulic fluid pipeline of the slave cylinder is connected with the pushing spring side of the second piston, and a relief valve for adjusting pump discharge pressure arranged in the automatically operated hydraulic fluid feed mechanism is connected between the hydraulic fluid pipeline of the automatically operated hydraulic fluid feed mechanism and an oil tank, and a stopper to restrict a stroke of the slave cylinder is arranged in the slave cylinder.

DETAILED DESCRIPTION OF THE PREFERRED EMBODIMENTS

First Embodiment

Figure 4:
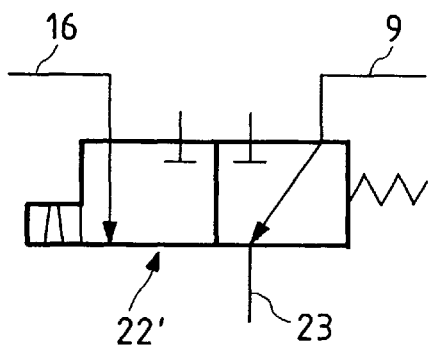
FIG. 4 is a schematic illustration showing an example of means for changing over the automatic clutch unit for vehicle use illustrated in FIG. 3.
Figure 5:
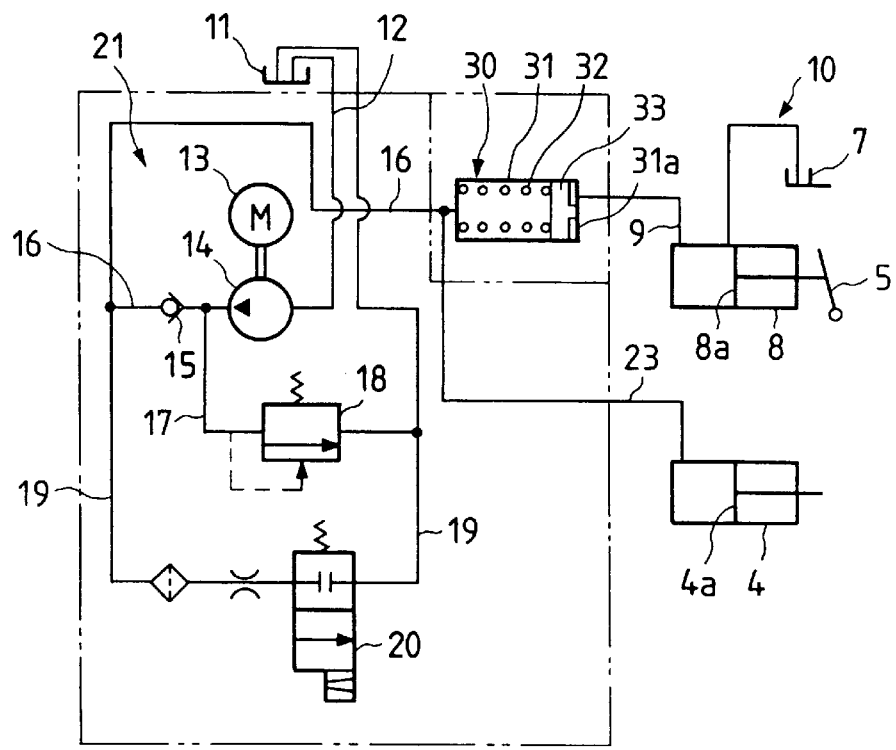
FIG. 5 is a hydraulic fluid circuit diagram showing an example of the automatic clutch unit for vehicle use which is a foundation of the present invention.
Figure 6:
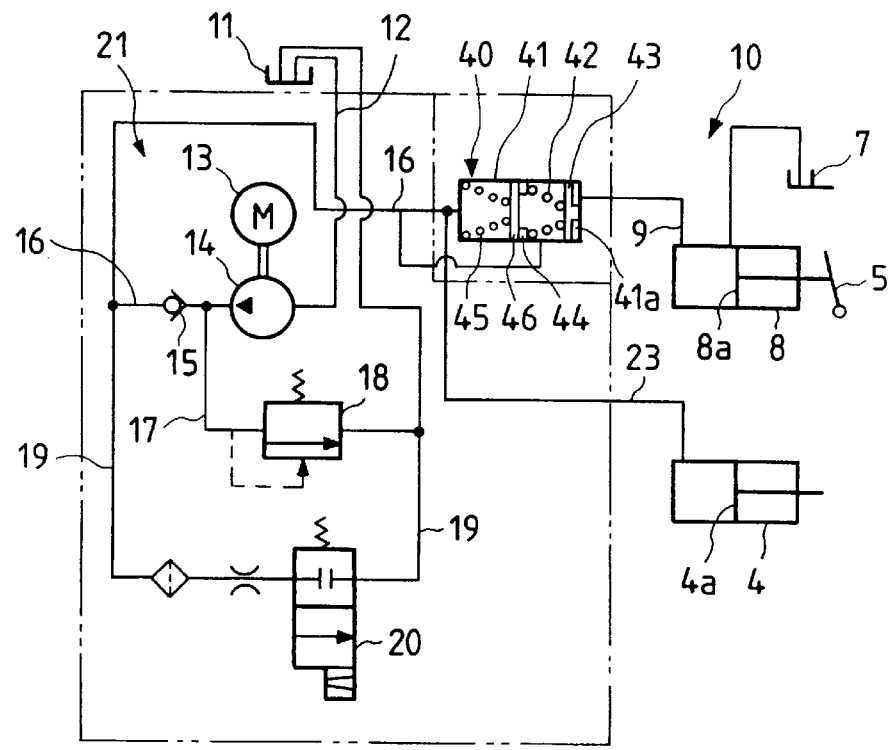
FIG. 6 is a hydraulic fluid circuit diagram showing another example of the automatic clutch unit for vehicle use which is a foundation of the present invention.

Referring to FIGS. 5 and 6, a first embodiment of the present invention will be explained in detail. In this connection, like reference characters are used to indicate like parts in the views of FIGS. 1 to 6 the same explanations are omitted here.

Figure 3:
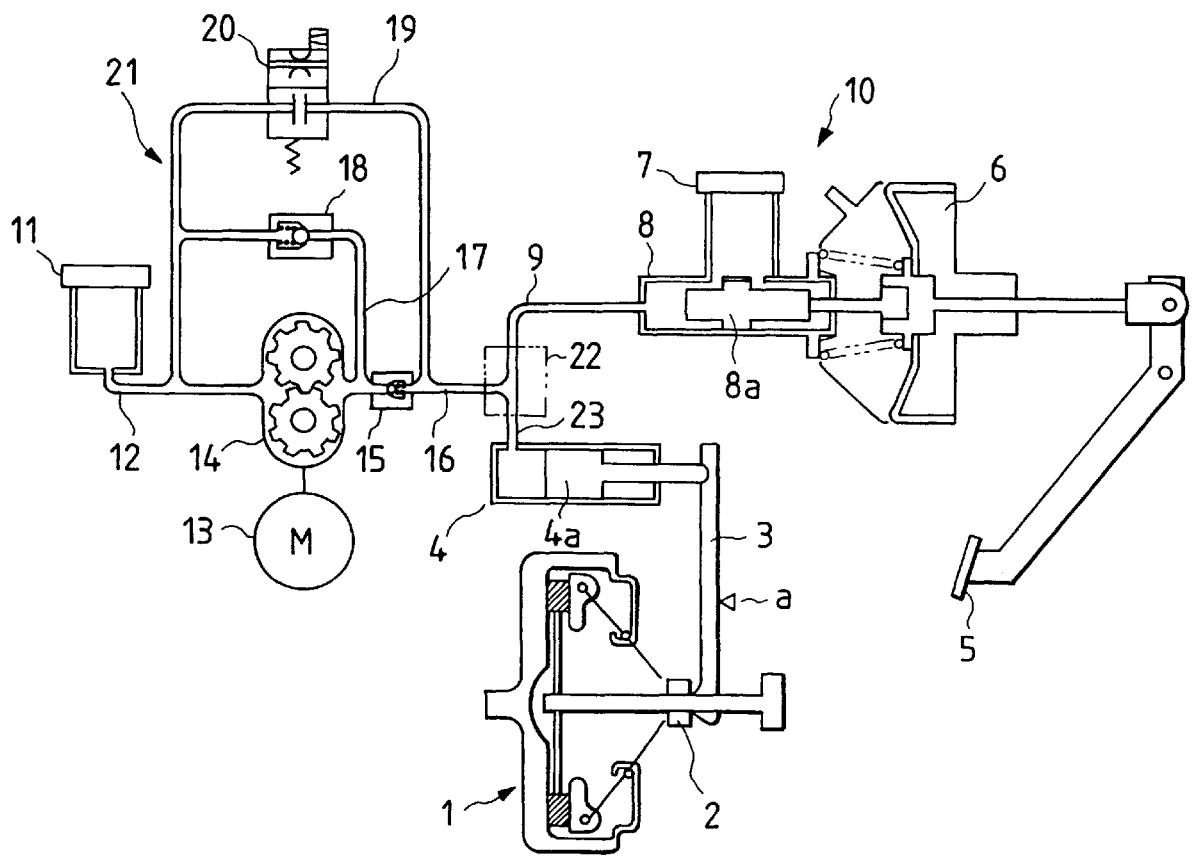
FIG. 3 is an overall arrangement view of the automatic clutch unit for vehicle use of the prior art.

In the automatic clutch unit for vehicle use according to the present invention illustrated in FIGS. 5 and 6, there are respectively provided change-over cylinders 30, 40 instead of the change-over mechanism 22 and the electromagnetic change-over valve 22' at the respective positions shown in FIGS. 3 and 4.

The change-over cylinder 30 illustrated in FIG. 5 is composed in such a manner that a piston 33 pushed by a spring 32 is incorporated in a cylinder 31 on one side 31a of the cylinder 31. In the above piston 33, there is formed a protrusion 33a which faces the aforementioned one side 31a. Therefore, even when the piston 33 is pushed by the spring 32 onto the one side 31a of the cylinder 31 in the case of non-operation, there is formed a clearance between the one side 31a and the piston 33 so that the pushing operation of the piston 33 can be easily performed.

Piping is conducted on the change-over cylinder 30 as follows. A hydraulic fluid pipeline 9 of the manually operated hydraulic fluid feed mechanism 10 is connected with the piston 33 side of the cylinder 31, that is, the one side 31a of the cylinder 31. A hydraulic fluid pipeline 16 of the automatically operated hydraulic fluid feed mechanism 21, and a hydraulic fluid pipeline 23 of the slave cylinder 4 are respectively connected with the spring 32 side of the cylinder 31.

The automatic clutch unit for vehicle use arranged as described above shown in FIG. 5 is operated in the following manner. For example, when operation of the friction clutch 1 is changed over from the manual operation to the automatic operation, the motor 13 is turned on manually or automatically, so that the gear pump 14 is driven by the motor 13. Then hydraulic fluid is pressured. The pressured hydraulic fluid opens the check valve 15 and gets into the cylinder 4 via the hydraulic fluid pipeline 16 and the pipeline 23. Accordingly, the piston 4a is pushed to the right in FIG. 5. Due to the foregoing, the friction clutch 1 is disengaged via the clutch release fork and the release bearing. At this time, pressure in the cylinder 31 on the spring 32 side of the change-over cylinder 30 becomes the same as that in the pipeline 16. Therefore, only the piston 33 is pushed to the one side 31a of the cylinder 31, and no problems are caused.

When power supply to the motor 13 is turned off and the gear pump 14 is stopped and also when the electromagnetic valve 20 for adjusting the returning speed of hydraulic fluid is opened while it is being controlled, hydraulic fluid is returned from the slave cylinder 4 to the oil tank 11 by the returning motion of the piston 4a via the release bearing and the clutch release fork, wherein hydraulic fluid flows in the pipeline 23, the hydraulic fluid pipeline 16, the returning pipeline 19 and the electromagnetic valve 20. Due to the foregoing operation, the friction clutch 1 is engaged.

Operation is changed over from the-automatic operation to the manual operation as follows. When the clutch pedal 5 is depressed under the condition that power supply to the motor 13 is turned off, the piston 8a in the master cylinder 8 is moved to the left in FIG. 5, and hydraulic fluid flows with pressure into the cylinder 31 from the one side 31a of the cylinder 31 of the change-over cylinder 30 via the hydraulic fluid pipeline 9.

Due to the foregoing, the piston 33 is moved to the left in the cylinder 31 while it resists a force generated by the spring 32. Therefore, hydraulic fluid accommodated on the spring 32 side in the cylinder is pushed out to the hydraulic fluid pipeline 16 and the pipeline 23. However, since the hydraulic fluid pipeline 16 is shut off by the check valve 15 and the electromagnetic valve 20, substantially all hydraulic fluid gets into the slave cylinder 4, and the piston 4a is pushed to the right in FIG. 5. Due to the foregoing, the friction clutch 1 is disengaged via the clutch release fork and the release bearing.

When the clutch pedal 5 is returned, operation is performed as follows. The piston 8a in the master cylinder 8 is returned to the right in FIG. 5 by the action of a spring arranged in the cylinder 8. At the same time, the piston 4a is returned by the action of a spring arranged in the friction clutch 1 via the release bearing and the clutch release fork. When the piston 4a is returned as described above, hydraulic fluid is returned from the slave cylinder 4 into the cylinder 31 of the change-over cylinder 30 via the pipeline 23. By the action of this returned hydraulic fluid and the spring 32, the piston 33 is moved to the one side 31a described before. Therefore, hydraulic oil accommodated in a chamber between the piston 33 and the one side 31a is returned to the oil tank 7 via the master cylinder 8. Due to the above operation, the friction clutch 1 is engaged.

The change-over cylinder 40 illustrated in FIG. 6 includes: a first piston 43 arranged in the change-over cylinder 41 and pushed onto the one side 41a of the cylinder 41 by the action of the spring 42; and a second piston 46 pushed by the spring 45 so that it can be contacted with the stopper 44 arranged in the middle of the cylinder 41. In the same manner as described before, in the first piston 43, there is formed a protrusion 43a which faces the aforementioned one side 41a. Therefore, even when the piston 43 is pushed by the spring 42 onto the one side 41a of the cylinder 41 in the case of non-operation, there is formed a clearance between the one side 41a and the first piston 43 so that the pushing operation of the piston 43 can be easily performed.

Piping to the change-over cylinder 40 is arranged as follows. The hydraulic fluid pipeline 9 of the manually operated hydraulic fluid feed mechanism 10 is connected to the first piston 43 side of the cylinder 41, that is, the one side 41a of the cylinder 41. The hydraulic fluid pipeline 16 of the automatically operated hydraulic fluid feed mechanism 21 is connected to a portion of the cylinder 41 between both pistons 43 and 46. Further, the hydraulic fluid pipeline 23 of the slave cylinder is connected with the pushing spring side of the second piston.

The automatic clutch unit for vehicle use arranged as described above shown in FIG. 6 is operated in the following manner. For example, when operation of the friction clutch 1 is changed over from the manual operation to the automatic operation, the motor 13 is turned on manually or automatically, so that the gear pump 14 is driven by the motor 13. Then, pressure of hydraulic fluid is increased, and hydraulic fluid opens the check valve 15 and gets into a chamber between both pistons 43, 46 of the change-over cylinder 40 via the hydraulic fluid pipeline 16, so that both pistons 43 and 46 are pushed. Due to the foregoing, the second piston 46 is moved to the left in FIG. 6 while it resists a force of the spring 45. Therefore, hydraulic fluid is made to flow with pressure from the cylinder 41, in which the spring 45 is arranged, into the slave cylinder 4 via the pipeline 23. Accordingly, the piston 4a is pushed to the right in FIG. 5. Due to the foregoing, in the same manner as described above, the friction clutch is disengaged via the clutch release fork and the release bearing.

When power supply to the motor 13 is turned off and the gear pump 14 is stopped and also when the electromagnetic valve 20 for adjusting the returning speed of -hydraulic fluid is opened while it is being controlled, hydraulic fluid is returned from the slave cylinder 4 to a chamber in the cylinder 41 in which the spring 45 is arranged via the pipeline 23. By the action of this returned hydraulic fluid and the spring 45, the second piston 46 is moved to a position at which the second piston 46 comes into contact with the stopper 44 in FIG. 6. Due to the foregoing, hydraulic fluid is returned from the chamber formed between both pistons 43 and 46 to the oil tank 11 via the hydraulic fluid pipeline 16, the returning pipeline 19 and the electromagnetic valve 20. Due to the foregoing operation, the friction clutch 1 is engaged.

Operation is changed over from the automatic operation to the manual operation as follows. When the clutch pedal 5 is depressed under the condition that power supply to the motor 13 is turned off, the piston 8a in the master cylinder 8 is moved to the left in FIG. 6, and hydraulic fluid flows with pressure into the cylinder 41 from the one side 41a of the cylinder 41 of the change-over cylinder 40 via the hydraulic fluid pipeline 9.

Due to the foregoing, the first piston 43 is moved to the left in the cylinder 41 while it resists a force generated by the spring 42, and the second piston 46 is moved to the left in FIG. 6 while it resists a force generated by the spring 45. Therefore, hydraulic fluid accommodated in the cylinder 41 having the spring 45 is made to flow with pressure into the slave cylinder 4 via the pipeline 23. Accordingly, the piston 4a is pushed to the right in FIG. 6. Due to the foregoing, in the same manner as described before, the friction clutch is disengaged via the clutch release fork and the release bearing. At this time, hydraulic fluid accommodated in a chamber formed between both pistons 43 and 46 attempts to flow into the hydraulic fluid pipeline 16. However, since the hydraulic fluid pipeline 16 is shut off by the check valve 15 and the electromagnetic valve 20, it is impossible for the hydraulic fluid accommodated in a chamber formed between both pistons 43 and 46 to flow into the hydraulic fluid pipeline 16.

When the clutch pedal 5 is returned, operation is performed as follows. The piston 8a in the master cylinder 8 is returned to the right in FIG. 6 by the action of a spring arranged in the cylinder 8. At the same time, the piston 4a is returned by the action of a spring arranged in the friction clutch 1 via the release bearing and the clutch release fork. When the piston 4a is returned as described above, hydraulic fluid is returned from the slave cylinder 4 into a chamber, in which the spring 45 is arranged, in the cylinder 41 of the change-over cylinder 40 via the pipeline 23. By the action of this returned hydraulic fluid and the spring 45, the second piston 46 is moved to a position at which the second piston 46 comes into contact with the stopper 44. Since the first piston 43 is moved to one side 31a by the action of hydraulic fluid and the spring 42, hydraulic fluid accommodated in a chamber between the first piston 43 and one side 41a is returned to the oil tank 7 via the master cylinder 8. Due to the above operation, the friction clutch 1 is engaged.

Second Embodiment

Figure 1:
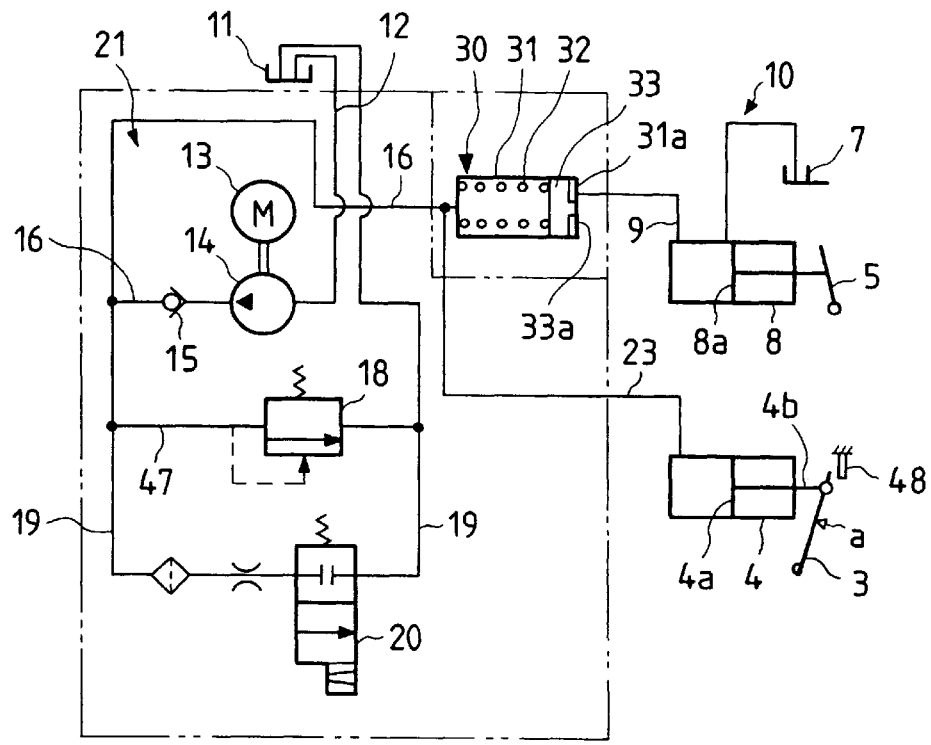
FIG. 1 is a hydraulic circuit diagram showing an example of the automatic clutch unit for vehicle use of the present invention.
Figure 2:
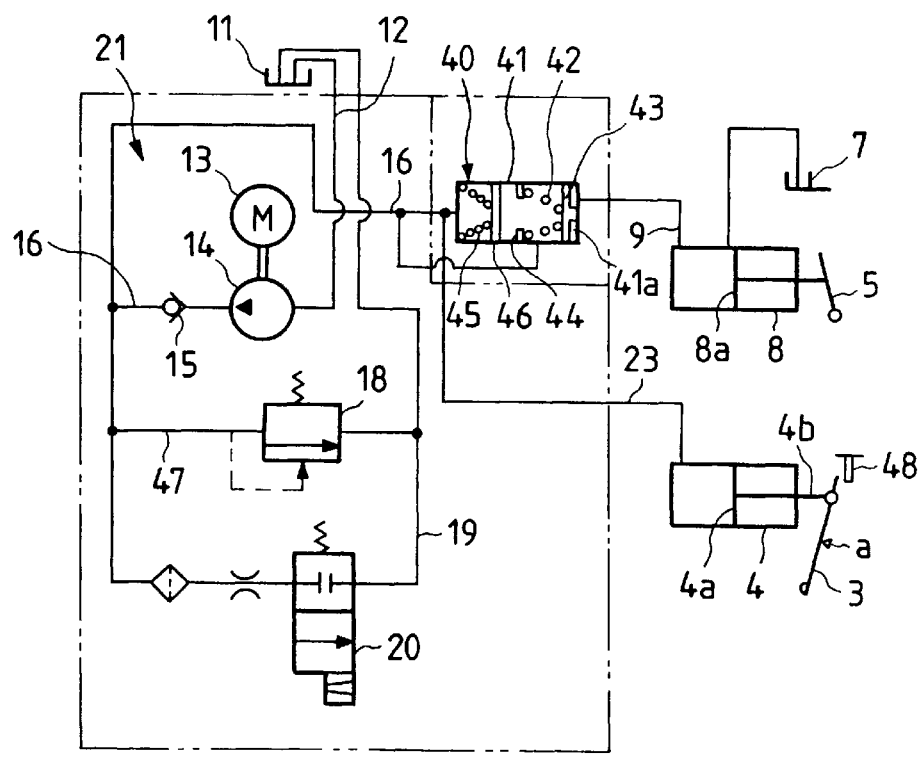
FIG. 2 is a hydraulic circuit diagram showing another example of the automatic clutch unit for vehicle use of the present invention.

Referring to FIGS. 1 and 2, an embodiment of the present invention will be explained in detail.

In the automatic clutch unit for vehicle use of the present invention illustrated in FIGS. 1 and 2, the relief valve 18 for adjusting the pump pressure, which is provided in the automatically operated hydraulic fluid feed mechanism 21 of the automatic clutch unit for vehicle use illustrated in FIGS. 5 and 6, is arranged as follows. As illustrated in FIGS. 1 and 2, the relief valve 18 is arranged between the hydraulic fluid pipeline 16 of the automatically operated hydraulic fluid feed mechanism 21 and the oil tank 11. Specifically, the relief valve 18 is connected with the pipeline 47 so that the electromagnetic valve 20 in the returning pipeline 19 connected with the hydraulic fluid pipeline 16 can be bypassed. Also, in the automatic clutch unit for vehicle use of the present invention illustrated in FIGS. 1 and 2, there is provided a stopper 48 for restricting a stroke of the piston 4a, at a position close to the clutch release fork 3 connected with an end of the rod 4b of the piston 4a of the slave cylinder 4.

The automatic clutch units for vehicle use arranged as described above shown in FIGS. 1 and 2 are operated in the following manner. For example, when operation of the friction clutch 1 is changed over from the manual operation to the automatic operation, the motor 13 is turned on manually or automatically, so that the gear pump 14 is driven by the motor 13. Then hydraulic fluid is pressured. The pressured hydraulic fluid opens the check valve 15 and directly gets into the cylinder 4 via the hydraulic fluid pipeline 16 and the pipeline 23 as illustrated in FIG. 1. Alternatively, hydraulic fluid is made to flow with pressure into a chamber between both pistons 43, 46 in the cylinder 41 of the change-over cylinder 40 via the hydraulic fluid pipeline 16, so that both pistons 43, 46 are pushed by the pressured hydraulic fluid. Due to the foregoing, the second piston 46 is moved to the left in FIG. 2 while it resists a force of the spring 45. Therefore, hydraulic fluid in the cylinder 41 in which the spring 45 is arranged is made to flow with pressure into the slave cylinder 4 via the pipeline 23 as illustrated in FIG. 2.

Accordingly, the piston 4a is pushed to the right in FIGS. 1 and 2. Due to the foregoing motion of the piston, the friction clutch is disengaged via the clutch release fork and the release bearing in the same manner as described before. When operation is changed over from the automatic operation to the manual operation as described before under the condition that the slave cylinder 4 is filled with hydraulic fluid, the clutch pedal 5 is strongly depressed so that a hydraulic fluid pressure exceeding the setting pressure of the relief valve 18 can be generated. Then the piston 8a in the master cylinder 8 is moved to the left in FIGS. 1 and 2, and hydraulic fluid is made to flow with pressure into the cylinder 31, 41 from one side 31a, 41a of the cylinder 31, 41 of the change-over cylinder 30, 40 via the hydraulic fluid pipeline 9.

Due to the foregoing, the piston 33, 43 is moved to the left in the cylinder 31, 41 while it resists the spring 32, 42. Therefore, hydraulic fluid accommodated on the spring 32 side of the cylinder 31 shown in FIG. 1 and also hydraulic fluid accommodated in a chamber between the first piston 43 and the second one 46 shown in FIG. 2 get into the pipeline 47 via the hydraulic fluid pipeline 16 and one of the return pipelines 19. Then, hydraulic fluid opens the relief valve 18 arranged in the pipeline 47 and returns into the tank 11 via the other pipeline 19.

When the clutch pedal 5 is released under the above condition, the friction clutch is engaged because hydraulic fluid returns into the oil tank 11 as described above. Therefore, it becomes possible to conduct the manual operation.

When the clutch pedal 5 is strongly depressed, hydraulic fluid is made to flow with pressure into the slave cylinder 4 via the hydraulic fluid pipeline 23 so that hydraulic fluid attempts to move the piston 4a in the direction of disengagement of the friction clutch. However, by the action of the stopper 48, a stroke of the piston 4a is restricted. Therefore, a quantity of hydraulic fluid in the slave cylinder 4 is not increased and damage of the cylinder can be prevented.

According to the present invention, an automatic clutch unit for vehicle use capable of being manually operated comprises a change-over cylinder having a piston pushed to one side of the cylinder by a spring, arranged among a hydraulic fluid pipeline of the manually operated hydraulic fluid feed mechanism, a hydraulic fluid pipeline of the automatically operated hydraulic fluid feed mechanism and a hydraulic fluid pipeline of the slave cylinder, wherein the piston side of the cylinder is connected with the hydraulic fluid pipeline of the manually operated hydraulic fluid feed mechanism, and the spring side of the cylinder is connected with the hydraulic fluid pipelines of the automatically operated hydraulic fluid feed mechanism and the slave cylinder, and a relief valve for adjusting pump discharge pressure arranged in the automatically operated hydraulic fluid feed mechanism is connected between the hydraulic fluid pipeline of the automatically operated hydraulic fluid feed mechanism and an oil tank, and a stopper to restrict a stroke of the slave cylinder is arranged in the slave cylinder. According to the second invention, the change-over cylinder according to the first invention includes a first piston pushed to one side of the cylinder by a spring in the case of non-operation and a second piston pushed toward the first piston by a spring while a distance from the second piston to the first piston is maintained at a predetermined value, wherein the hydraulic fluid pipeline of the manually operated hydraulic fluid feed mechanism is connected with the first piston side of the change-over cylinder, the hydraulic fluid pipeline of the automatically operated hydraulic fluid feed mechanism is connected with a chamber of the change-over cylinder between both pistons, the hydraulic fluid pipeline of the slave cylinder is connected with the pushing spring side of the second piston, and a relief valve for adjusting pump discharge pressure arranged in the automatically operated hydraulic fluid feed mechanism is connected between the hydraulic fluid pipeline of the automatically operated hydraulic fluid feed mechanism and an oil tank, and a stopper to restrict a stroke of the slave cylinder is arranged in the slave cylinder. As described above, instead of the electromagnetic valve which is used in the automatic clutch unit of the prior art, the change-over cylinder in which the piston is housed is arranged in the automatic clutch unit of the present invention. Accordingly, both the automatically and the manually operated hydraulic fluid feed mechanism are not directly communicated with the slave cylinder, but they are communicated with the slave cylinder via the change-over cylinder. Accordingly, even if operation is changed over between the automatic operation and the manual operation in any case, no hydraulic fluid returns from the slave cylinder to any of the above hydraulic fluid feed mechanisms. Accordingly, quantities of hydraulic fluid in both hydraulic fluid feed mechanisms can be maintained in a well balanced condition. Since no hydraulic fluid returns from the slave cylinder to the oil tank, there is no possibility that the friction clutch is suddenly engaged and the vehicle starts fast.

In the automatically operated hydraulic fluid feed mechanism, there is arranged a relief valve for adjusting the pump pressure. This relief valve is connected between the hydraulic fluid pipeline of the automatically operated hydraulic fluid feed mechanism and the oil tank. Accordingly, when operation is changed over from the automatic operation to the manual operation under the condition that the slave cylinder is filled with hydraulic fluid, hydraulic fluid returns to the tank when a driver depresses the clutch pedal strongly. Therefore, the automatic operation can be changed over to the manual operation by a simple operation without causing any problems.

In the slave cylinder, there is arranged a stopper for restricting a stroke of the cylinder. Accordingly, it is possible to prevent the occurrence of a problem in which hydraulic fluid is made to flow with pressure into the slave cylinder when the clutch pedal is strongly depressed so that the pressure of hydraulic fluid in the slave cylinder is increased and the slave cylinder is damaged.

What is claimed is:

1. An automatic clutch unit for vehicle use comprising:
   a slave cylinder to engage and disengage a friction clutch;
   an automatically operated hydraulic fluid feed mechanism to be operated by a pump;
   a manually operated hydraulic fluid feed mechanism to be operated by the action of a clutch pedal; and
   a change-over cylinder, which includes a spring side and a piston side and has a piston pushed to one side of the change-over cylinder by a spring disposed on the spring side of the change-over cylinder, the change-over cylinder being arranged among a hydraulic fluid pipeline of the manually operated hydraulic fluid feed mechanism, a hydraulic fluid pipeline of the automatically operated hydraulic fluid feed mechanism and a hydraulic fluid pipeline of the slave cylinder,
   wherein the piston side of the change-over cylinder is connected with the hydraulic fluid pipeline of the manually operated hydraulic fluid feed mechanism, and the spring side of the change-over cylinder is connected with the hydraulic fluid pipelines of the automatically operated hydraulic fluid feed mechanism and the slave cylinder, and the hydraulic pressure generated by depressing the clutch pedal is transmitted to the slave cylinder when the piston of the change-over cylinder is moved.

2. An automatic clutch unit for vehicle use according to claim 1, further comprising:
   a relief valve, for adjusting pump discharge pressure, arranged in the automatically operated hydraulic fluid feed mechanism and connected between the hydraulic fluid pipeline of the automatically operated hydraulic fluid feed mechanism and an oil tank; and
   a stopper, to restrict a stroke of the slave cylinder, arranged in the slave cylinder.

* * * * *